United States Patent
Shen et al.

(10) Patent No.: US 11,176,400 B2
(45) Date of Patent: *Nov. 16, 2021

(54) MULTI-ANGLE PRODUCT IMAGING DEVICE

(71) Applicant: Conduent Business Services, LLC, Florham Park, NJ (US)

(72) Inventors: Yi-Ting Shen, Toronto (CA); Riyad Twahir, Milton (CA); Wencheng Wu, Rochester, NY (US); Dennis L. Venable, Marion, NY (US); Charles D. Rizzolo, Fairport, NY (US); Thomas F. Wade, Rochester, NY (US); Daniel S. Hann, Williamson, NY (US); Adrien P. Cote, Kitchener (CA)

(73) Assignee: Conduent Business Services, LLC, Florham Park, NJ (US)

( * ) Notice: Subject to any disclaimer, the term of this patent is extended or adjusted under 35 U.S.C. 154(b) by 113 days.

This patent is subject to a terminal disclaimer.

(21) Appl. No.: 16/675,319

(22) Filed: Nov. 6, 2019

(65) Prior Publication Data

US 2020/0074206 A1    Mar. 5, 2020

Related U.S. Application Data

(63) Continuation of application No. 16/139,168, filed on Sep. 24, 2018, which is a continuation of application
(Continued)

(51) Int. Cl.
*G06K 9/32* (2006.01)
*H04N 1/00* (2006.01)
(Continued)

(52) U.S. Cl.
CPC ........... *G06K 9/3208* (2013.01); *G06F 16/51* (2019.01); *G06K 7/10722* (2013.01);
(Continued)

(58) Field of Classification Search
CPC ........... G06K 7/10722; G06K 7/10861; G06K 7/1443; G06K 9/3208; G06K 9/4604;
(Continued)

(56) References Cited

U.S. PATENT DOCUMENTS 7,253,832 B2    8/2007  Iwaki et al.
7,440,685 B2 *  10/2008 Weng .................. F16M 11/046
                                                                396/419
(Continued)

OTHER PUBLICATIONS

360 Product Photography Turntables—Iconasys Inc. webpage, printed from internet Jun. 29, 2016, http://iconasys.com/360-product-photography-turntables-and-software/.
(Continued)

*Primary Examiner* — Jessica M Prince
(74) *Attorney, Agent, or Firm* — Fox Rothschild LLP (57) ABSTRACT

A system for acquiring multi-angle images of a product includes a workstation having a working surface for placing a product, a camera supporting member having a vertical axis, and an image capturing device movably attached to the camera supporting member so that it may move along the vertical axis of the camera supporting member. The system captures and analyzes a digital image of a product to detect the vertical center of the product, and adjusts the position of the image capturing device along the vertical axis so that the vertical center of the product is proximate to the vertical center of the image. The system may also have a turntable and additionally rotate the turntable at multiple capturing angles and capture one or more additional digital images of the product at various capturing angles and store the one or more additional images in a product database.

20 Claims, 6 Drawing Sheets

Related U.S. Application Data

No. 15/222,993, filed on Jul. 29, 2016, now Pat. No. 10,108,872.

(51) Int. Cl.

| | | |
|---|---|---|
| *G06K 9/46* | (2006.01) | |
| *G06K 7/10* | (2006.01) | |
| *G06K 7/14* | (2006.01) | |
| *G06F 16/51* | (2019.01) | |
| *H04N 7/18* | (2006.01) | |
| *H04N 5/222* | (2006.01) | |
| *G06T 7/10* | (2017.01) | |
| *G06T 7/11* | (2017.01) | |
| *G06T 7/73* | (2017.01) | |
| *G06T 7/13* | (2017.01) | |
| *H04N 5/28* | (2006.01) | |
| *G06T 7/246* | (2017.01) | |
| *G06T 7/70* | (2017.01) | |
| *G06T 7/194* | (2017.01) | |

(52) U.S. Cl.
CPC ....... *G06K 7/10861* (2013.01); *G06K 7/1443* (2013.01); *G06K 9/4604* (2013.01); *G06T 7/10* (2017.01); *G06T 7/11* (2017.01); *G06T 7/13* (2017.01); *G06T 7/246* (2017.01); *G06T 7/70* (2017.01); *G06T 7/73* (2017.01); *H04N 1/00204* (2013.01); *H04N 1/00562* (2013.01); *H04N 5/222* (2013.01); *H04N 5/28* (2013.01); *H04N 7/18* (2013.01); *G06T 7/194* (2017.01); *H04N 2201/0084* (2013.01)

(58) Field of Classification Search
CPC ... G06F 16/51; G06T 7/10; G06T 7/11; G06T 7/13; G06T 7/194; G06T 7/246; G06T 7/70; G06T 7/73; H04N 1/00204; H04N 1/00562; H04N 2201/0084; H04N 5/222; H04N 5/28; H04N 7/18

See application file for complete search history.

(56) References Cited

U.S. PATENT DOCUMENTS

| | | | |
|---|---|---|---|
| 8,301,022 | B1 * | 10/2012 | McGuire ................ G03B 15/06 396/2 |
| 10,260,672 | B2 * | 4/2019 | Martini ................ G03B 17/561 |
| 10,311,634 | B2 * | 6/2019 | Houghton ............ H04N 13/243 |
| 2003/0071194 | A1 | 4/2003 | Mueller et al. |
| 2005/0226464 | A1 | 10/2005 | Sun et al. |
| 2006/0125924 | A1 | 6/2006 | Ing-Song et al. |
| 2006/0261157 | A1 | 11/2006 | Ostrowski et al. |
| 2007/0140526 | A1 | 6/2007 | Pirim |
| 2011/0010776 | A1 | 1/2011 | Ceraolo |
| 2014/0376768 | A1 * | 12/2014 | Troy .................... G01S 3/7864 382/103 |
| 2015/0381968 | A1 | 12/2015 | Arora et al. |
| 2016/0189286 | A1 | 6/2016 | Zohar et al. |
| 2016/0343064 | A1 | 11/2016 | Christopher |
| 2017/0034505 | A1 | 2/2017 | Fusama |
| 2017/0358119 | A1 | 12/2017 | Forutanpour et al. |
| 2017/0363248 | A1 | 12/2017 | Martini |
| 2019/0139310 | A1 * | 5/2019 | Holzer ............... G06K 9/00671 |

OTHER PUBLICATIONS

360° Product Photography Archives, Ortery Ortery webpage, printed from internet Jun. 29, 2016, http://ortery.com/photography-equipment/360-product-photography/.

\* cited by examiner

MULTI-ANGLE PRODUCT IMAGING DEVICE

RELATED APPLICATIONS AND CLAIM OF PRIORITY

This patent application claims priority to and is a continuation of U.S. patent application Ser. No. 16/139,168, filed Sep. 24, 2018, which claims priority to and is a continuation of U.S. patent application Ser. No. 15/222,993, filed Jul. 29, 2016, now U.S. Pat. No. 10,108,872. The disclosures of each of the priority applications are fully incorporated by reference.

BACKGROUND

This patent document relates to an image capturing device, and particularly to an image capturing device that automatically captures multi-angle product images.

The imaging of retail environments, specifically shelving, is an emerging area. For example, recognizing the types and presence/absence of products from store shelf imagery could provide key data to enable new retail services. A key input for recognizing products from store shelf imagery is multi-angle reference images of each individual product. Standard product images can be obtained from consumer packaged goods (CPGs) or organizations that aggregate merchandising data (such as GS-1). However, such images are generally limited to certain product categories/manufacturers and may not have the appropriate profile views of the product for the purpose of robustly recognizing them and extracting key information from them. These challenges and potential needs for new systems apply to both custom in-house and private-label brands.

In other applications, such as photographing evidence in forensics and proving ownerships for insurance purposes, there is a need to automatically capture multiple images of an article or product. Existing product image capturing devices and methods often require a significantly high number of steps to capture the information, and generally they are not easy to use. For example, many systems require a manual setup, calibration and/or user intervention when taking multi-angle product images.

This document describes devices that address some or all of the issues described above.

SUMMARY

A system for acquiring multi-angle images of a product may include a computing device; a workstation having a working surface, at least one background wall and a camera supporting member having a vertical axis; and an image capturing device movably attached to the camera supporting member so that the image capturing device may be moved along the vertical axis of the camera supporting member. The computing device may be programmed to control the image capturing device to capture a digital image of the product, analyze the captured digital image and detect a vertical center of the product, and control the image capturing device to move along the vertical axis to adjust its position so that the vertical center of the product is proximate to the vertical center of the first digital image. The computing device may be programmed to control the image capturing device to capture one or more additional digital images of the product and store the one or more additional images in a product database.

Additionally, the system may also include a turntable rotatably mounted to the workstation and configured to hold a product. The computing device may be programmed to rotate the turntable to multiple capturing angles and control the image capturing device to capture one of the additional digital images of the product at each of the multiple capturing angles. Alternatively and/or additionally, the system may detect a barcode of the product, compare the detected barcode of the product with one or more product barcodes stored in a product database, and suspend subsequent capturing if the detected barcode of the product matches at least one product barcode in the product database.

In an embodiment, the system may include a laser based range sensor mounted on the camera supporting member, where the laser based range sensor may detect the distance between the image capturing device and the product. In one embodiment, the system may calculate the dimension of the product based on the one or more captured additional images and the detected distance between the image capturing device and the product.

In an embodiment, the system may include one or more light panels to illuminate the product. Additionally, the background wall and the working surface of the workstation may intersect seamlessly at a curved corner to improve the quality of captured images.

In an embodiment, a method of acquiring multi-angle images of a product using the system described in this document may include: (a) placing a product on the workstation; (b) capturing an image of the product; (c) analyzing the captured first image and detecting a vertical center of the product; (d) determining if the vertical center of the product is within a proximate distance to the vertical center of the first image; (e) upon determining that the vertical center of the product is not within the proximate distance to the vertical center of the first image, causing the image capturing device to move along the vertical axis a location based on the distance between the vertical center of the product and the vertical center of the first image; (f) capturing one or more additional images of the product after the image capturing device has moved to the location; and (g) storing the one or more additional images in a product database.

Additionally, the method may also include placing the product on a turntable, rotating the turntable to multiple capturing angles, and capturing one of the additional images at each of the multiple capturing angles.

In one embodiment, the method of detecting the vertical center of the product may include calculating an image intensity profile of the image of the product, calculating a derivative of the image intensity profile, detecting an upper edge and a lower edge of the product based on the derivative of the image intensity profile, and determining the vertical center of the product based on the detected upper edge and the lower edge of the product. In another embodiment, the method may detect the vertical center of the product by segmenting the first image and detecting a foreground of the first image based on the segmented image.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

The term "product" refers to an article or substance that is manufactured, such as a retail product; machine-made or hand-made equipment, or a machine. A product may or may not have a barcode on it.

The term "barcode" refers to a pattern or symbol that contains encoded data. Barcodes may include, for example, one-dimensional barcodes, two-dimensional barcodes (such as matrix codes, Quick Response ("QR") codes, Aztec codes and the like), or three-dimensional barcodes.

Each of the terms "barcode detection" or "detecting a barcode" refers to a process of reading the information embedded in the barcode, which may include recognizing the presence of a barcode from a digital representation, such as a captured image, and/or decoding the information embedded in the barcode.

Figure 1:
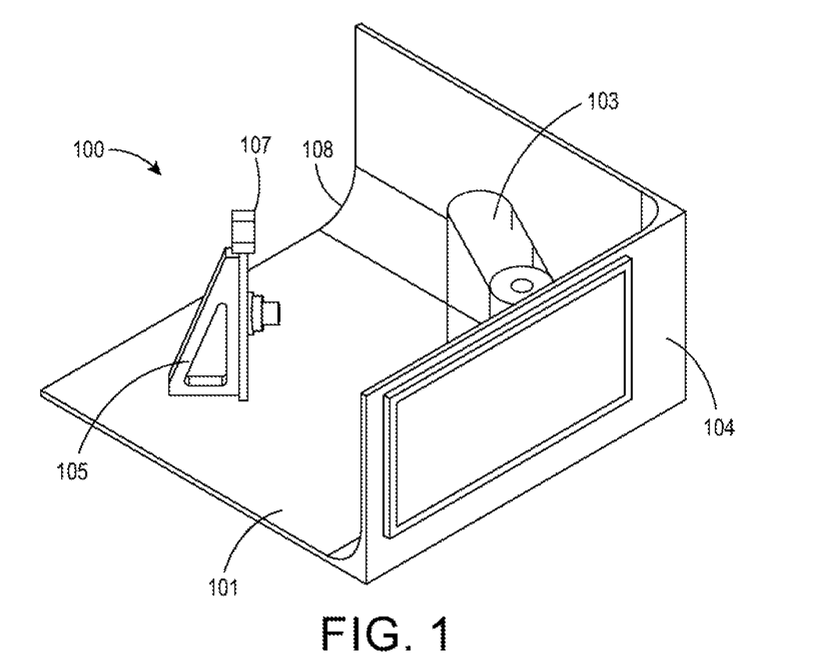
FIG. 1 depicts a perspective view of a workstation of a multi-angle product imaging device according to an embodiment.
Figure 2:
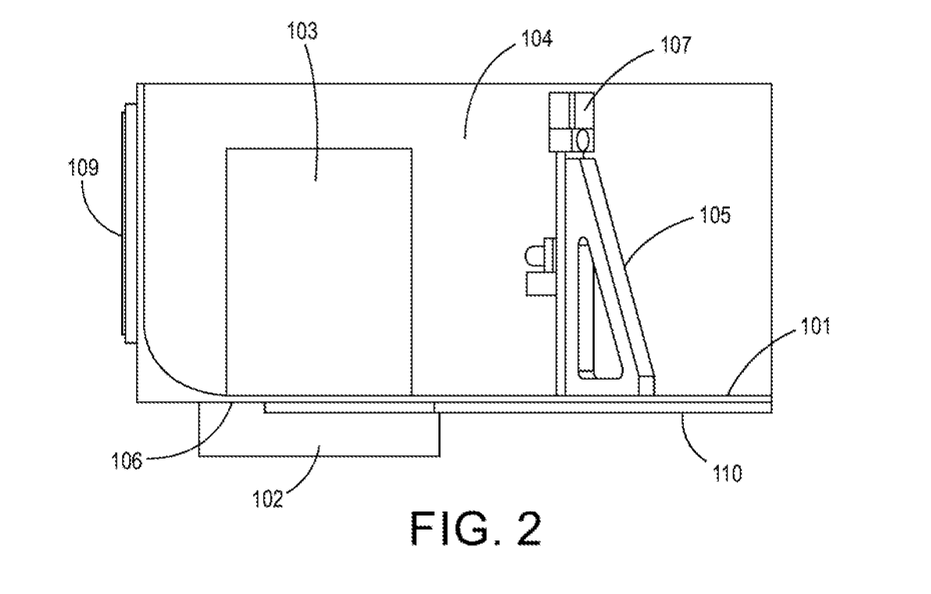
FIG. 2 depicts a side view of a workstation of a multi-angle product imaging device according to an embodiment.

With reference to FIGS. 1 and 2, a system for acquiring multi-angle images of a product is shown from different perspectives. The system may include a workstation 100 that has a working surface 101, a turntable 102, at least one background wall 104, and a camera supporting member 105 mounted on the workstation. The turntable 102 may be mounted to the workstation and freely rotate about the center. The turntable 102 may also have, or be positioned under, a surface 106 for holding a product 103 for which multi-angle images are to be captured. In some embodiments, the turntable 102 can be mounted to the working surface 101 in various ways. For example, the turntable 102 can be mounted underneath the working surface so that the surface of the turntable 106 may be flush with the working surface 101. This allows the surface of the turntable to be an integrated part of the working surface such that when an image is captured for a product placed on the turntable, the background of the image that may include part of the turntable and the working surface will look consistent, thus making it easier to segment the product from the background image. In another example, the turntable may be mounted above the working surface for easy mount.

With reference to FIG. 2, the turntable 102 may include a motor so it can be rotated automatically. In one embodiment, the motor of the turntable can be communicatively coupled to a power relay or a control system, and configured to be electronically controlled by a computing device to rotate the turntable about a center. For example, the turntable can be connected to the control system by a cable such as a USB cable or any other types of cable that can transmit control signals from the control system to the motor of the turntable, and/or transmit the status of the turntable to the control system. In another example, the motor of the turntable can be remotely controlled by a computing device wirelessly, e.g. via infrared, Bluetooth, Wi-Fi, near-field communication (NFC) or any other wireless protocols.

The camera supporting member 105 may include a camera mount 107 to mount an image capturing device to the supporting member. The camera mount may include a motorized linear slide that can move vertically and adjust z-axis position of the camera. In one embodiment, the linear slide can be communicatively coupled to a control system to be electronically controlled to slide the image capturing device vertically along an axis of the supporting member. For example, the linear slide motor can be wired to a computing device, or wirelessly controlled by the computing device remotely. Other moveable elements may be used, such as a lift structure, a pulley system, a set of motorized rollers, or other devices.

The system can work with a variety of image capturing devices to capture multi-angle images of a product. In one embodiment, the image capturing device can be a digital still camera or a video camera that is capable of capturing a still image or a video of a product. The image capturing device may have a different field of view (FOV) and may be at a different distance from the turntable (or the product to be imaged). For example, the image capturing device may be a camera that has 81 degrees FOV on the lateral direction and 50 degrees FOV on the axial direction. This is equivalent to a 25.5"×14.0" FOV when the camera is placed 15" from the product.

In some embodiments, the system may include a barcode system to detect the barcode of the product for which multi-angle images are being captured. In one embodiment, the system may further include a barcode reader, either fixedly mounted to the workstation, such as on the camera supporting member or a handheld scanner that the user can directly scan the barcode off of the product. Alternatively and/or additionally, the system may use image analysis techniques to analyze one of the captured images of the product and detect the barcode on the product.

Alternatively and/or additionally, the system may include a laser based range sensor that is communicatively coupled to the computing device. The range sensor can be mounted on the supporting member, facing the product and configured to measure the distance between the image capturing device and the product. The system may use the measured distance, and optionally/additionally the pixel dimensions measured from the captured image, to calculate the dimension of the product.

In improving the quality of captured images in one embodiment, the background wall provides a consistent background in the captured image. This may help avoid artifacts in the captured image and improve the performance of image recognition and analysis to be used in the system. For example, the background wall may include a photo backdrop. In another embodiment, the workstation may include one or more light panels (such as light emitting diode, or LED panels) to provide sufficient illumination for the product and/or to minimize shadow. Returning to FIG. 2, in one embodiment, the light panel can be mounted on one or more background walls 104, either as front panels or installed behind the background wall as back panels 109. Additionally, the working surface of the workstation 101 may also be equipped with one or more back light panels 110 underneath the surface.

To further improve the quality of images, in one embodiment, the background wall and the working surface of the workstation may intersect seamlessly, such as being constructed as a curved corner (108 in FIG. 1), at which the working surface extends into the background wall. Alternatively and/or additionally, the workstation can be made mobile for easy deployment of various services. In one embodiment, the workstation can have foldable legs with wheels attached. In another embodiment, the workstation can be made into a cylindrical capsule shape by maintaining the axial dimension and reducing the lateral dimensions.

Figure 3:
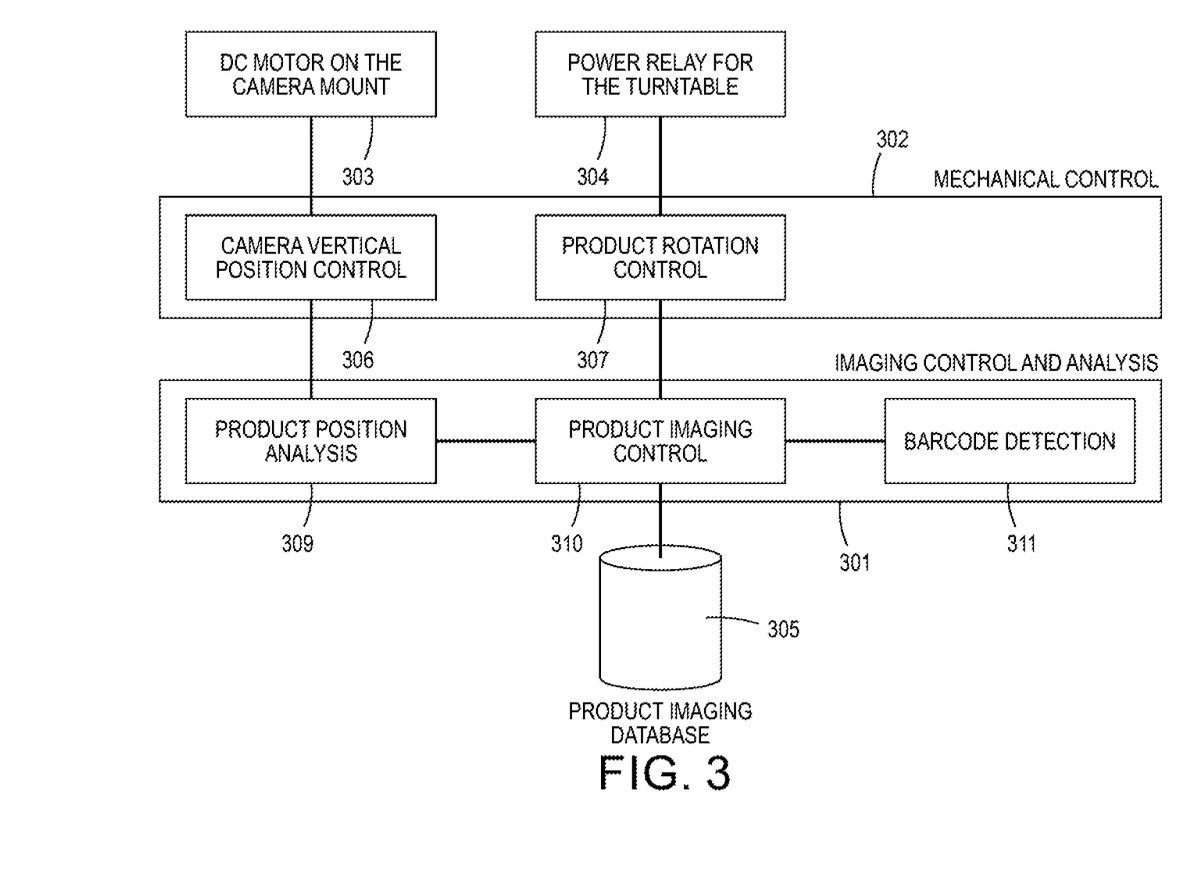
FIG. 3 depicts various components of a multi-angle product imaging device according to an embodiment.

With reference to FIG. 3, various embodiments of controlling and operating the image capturing system are shown. In one embodiment, the system may include a computing device having a processor, and a product imaging database 305 resided locally to store captured product images. In one embodiment, the system may also be capable of communicating with a database resided remotely, such as via the Internet. The system may store the multi-angle images of the product in the database or transmit one or more of the multi-angle images of the product to the database remotely.

With further reference to FIG. 3, the system may further include an imaging control and analysis system 301, mechanical control system 302, motor control for the camera mount 303 and power relay for the turntable 304. In one embodiment, the mechanical control system 302 may include camera vertical position control 306 and product rotation control 307. The camera vertical position control 306 can send control signals to the motor 303 to control the linear slide for the camera mount so as to precisely control the position of the camera. In one embodiment, the motor for the camera mount can be a DC motor, such as a 200 step/rev step motor. In one embodiment, the motorized linear slide for the camera mount may have a rail that has lead screw (2 mm/rev), which when combined with the 200 step/rev motor, may give a resolution of 0.01 mm in the vertical axis. The values listed in this paragraph are merely examples; other values are possible.

In one embodiment, the product rotation control 307 may send control signals to the power relay for the turntable 304 so as to precisely control the rotation of the turntable. The turntable can be controlled to position at any capturing angle specified in a capture setting, and can rotate in either clockwise or counter-clockwise direction. In one embodiment, the turntable can rotate at various speeds, for example, at a maximum speed of 2 rotations per minute.

With further reference to FIG. 3, the imaging control and analysis system 301 may include product position analysis 309, product imaging control 310 and barcode detection 311. The product position analysis 309 may be configured to perform image analysis operations on captured images and determine whether the product is vertically centered in the captured image. The product imaging control 310 may be configured to perform imaging related operations, such as controlling the image capturing device to capture images of the product and store the images to the product imaging database 305. Controlling the image capturing device may include sending control signals to the product rotation control 307 so as to control the rotation of the turntable to position the product on the turntable at any selected angle.

In some embodiments, the control of the camera and turntable of the workstation may be implemented by the computing device. The computing device may have a memory, such as ROM or RAM that stores program instructions, such as C, C++, Java, assembly language, and/or other computer or script languages, to control various components. In one embodiment, the program instructions may be configured to control the image capturing device to capture one or more digital images of the product. Additionally, the program instructions may be executed to cause the computing device to analyze the captured images and, based on the analysis of captured images, control the turntable and motorized linear slide of the camera mount. For example, based on the analysis of the captured image of the product, the system may determine that the product is too high or too low from the center of the image. Consequently, the system may adjust the image capturing device to move down or up so that the product can be centered in the captured image.

In some embodiments, the computing device may execute program instructions that control the turntable and the image capturing device to take multiple images of a product at different angles. For example, the system may control the turntable to rotate to an angle, capture an image of the product, then rotate the turntable to another angle, and then capture an additional image of the product, and repeat the steps to capture multiple images of the product, each taken at a different angle. In one embodiment, the user may pre-store a set of capturing angles in a capture setting. In one embodiment, the set of capturing angles may include 0, 45, 90, 180, 270 and 315 degrees. In another embodiment, the set of capturing angles may include 0, 90, 180 and 270 degrees. In another embodiment, the set of capturing angles may be determined based on the shape of the product. In an automated capturing of multi-angle images, the system will retrieve and extract the set of capturing angles and rotate the turntable at approximately each of the set of capturing angles and capture the image for each rotation. In one embodiment, the extent of the approximate rotation of the turntable may be +/−10% of each of the capturing angles.

With further reference to FIG. 3, alternatively and/or additionally, the barcode detection 311 may be configured to check the barcode of the product and determine, based on the barcode, whether the product for which images are to be captured is already in the database. Based on this determination, the system may further determine whether to continue or suspending the capturing of the current product or storing the captured images to the database. In one embodiment, the system may determine that the product is already in the database and may determine to suspend the capturing of images for the instant product. The system may alert the user, such as, displaying a message, to move on to capture images of the next product. In another embodiment, the system determines that the product is already in the database and may still determine to continue capturing images for the instant product and storing the captured images to the database. The system may compare these newly captured images with previously captured images for the same product and, based on the comparison, monitor the product packaging change over time, which may be helpful for an advertisement campaign.

Figure 4:
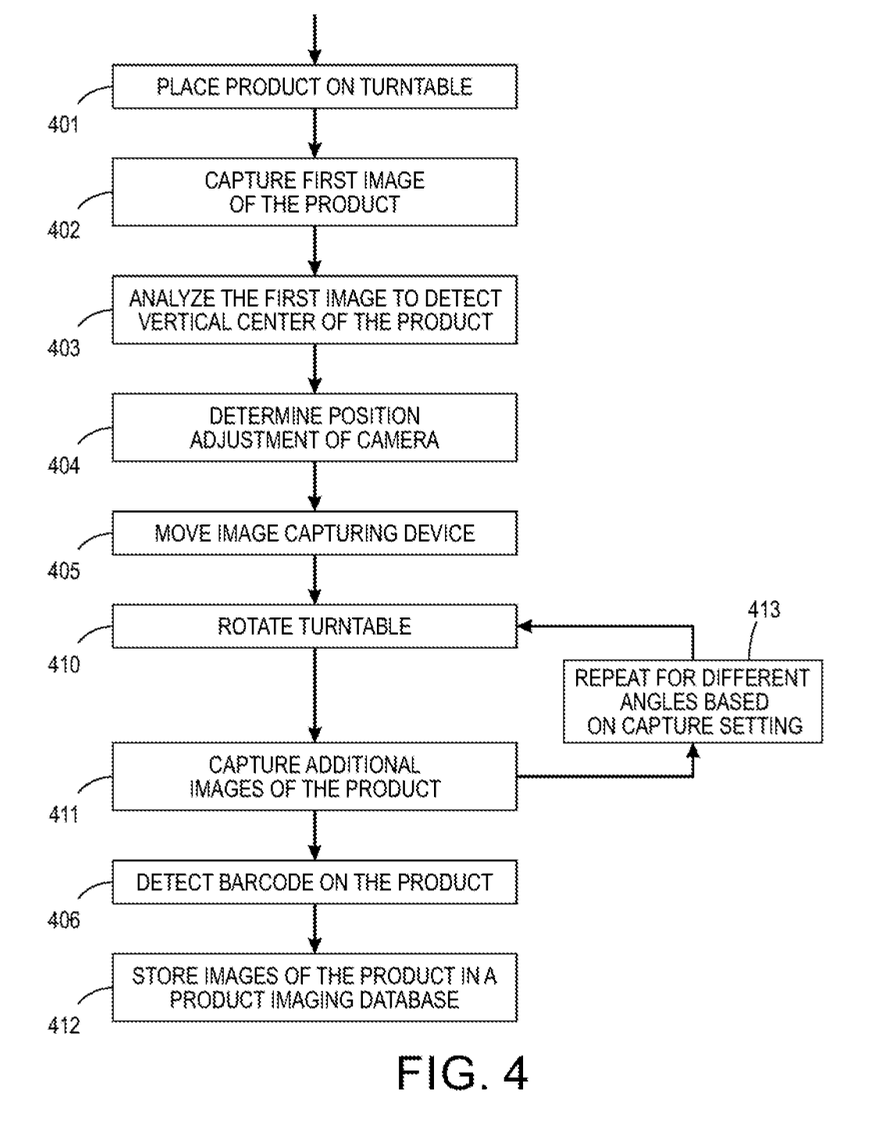
FIG. 4 is a diagram of capturing multi-angle images of a product according to one embodiment.

With reference to FIG. 4, methods for capturing multi-angle images of a product using the above disclosed embodiments of the image capturing system are provided. In one embodiment, the method may include placing a product on the turntable 401, using the image capturing device to capture the first digital image of the product 402, such as a bitmap image, then analyzing the captured first image to detect the vertical center of the product 403. Determining the vertical center of the product 403 is to determine whether the product is properly centered vertically in the captured image. In some embodiments, it may be desirable to have the center of the product proximate to or near the center of the image because lens distortion (rectangle become trapezoid) could cause subsequent product recognition to fail. If the system determines that the product is not vertically centered in the captured image, the system may determine the adjustment needed to reposition the camera so that the product will be properly centered for subsequent capturing.

In one embodiment, the system may capture a single digital image of the product and analyze the single image to determine whether the product is centered vertically. In another embodiment, the system may capture a video, or a sequence of digital images of the product, and analyze on or more images in the sequence.

Figure 5:
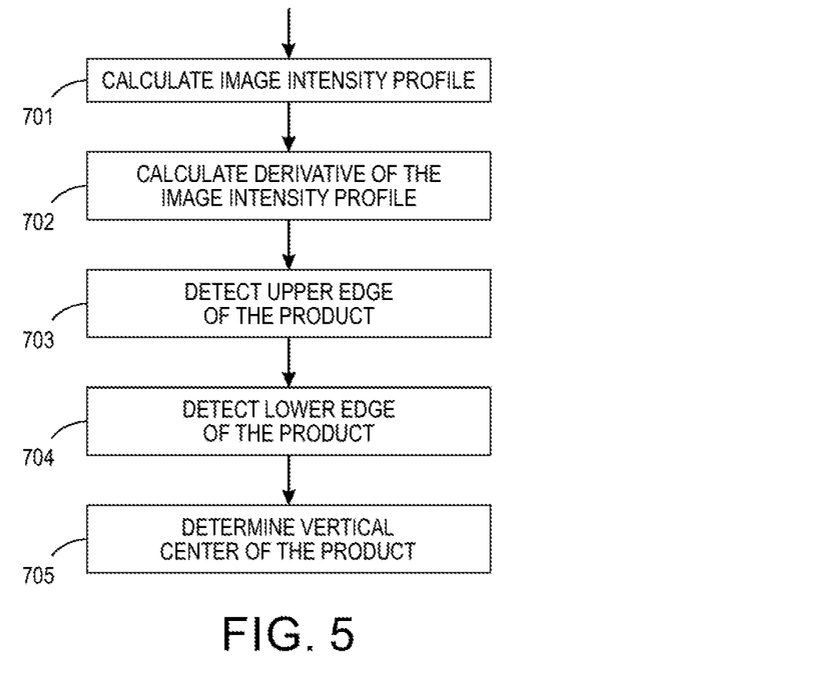
FIG. 5 is a diagram of detecting the vertical center of a product according to one embodiment.

With reference to FIG. 5, in one embodiment, the method for determining the vertical center of the product may include calculating an image intensity profile 701 followed by calculating the derivative of the image intensity profile 702, detecting the upper edge of the product 703, detecting the lower edge of the product 704, and determining the vertical center of the product 705. These steps will be further explained with reference to FIG. 6.

Figure 6A:
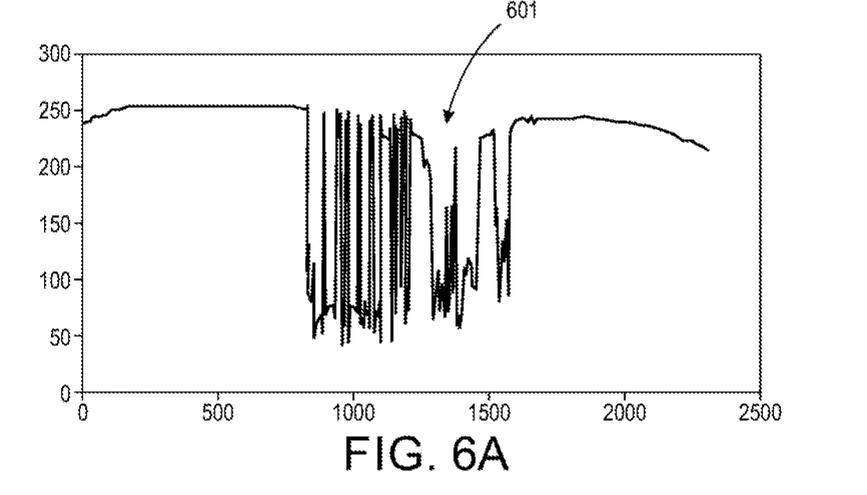
FIGS. 6A and 6B illustrate an image intensity profile and its derivative according to one embodiment.
Figure 6B:
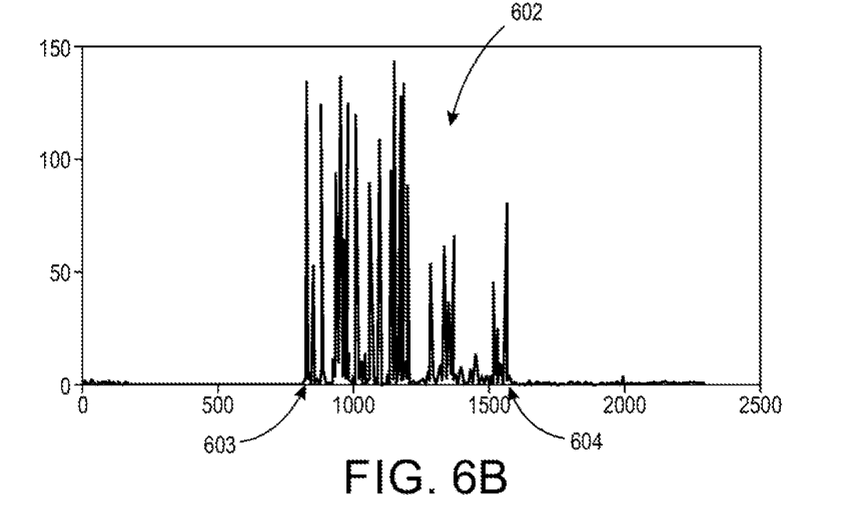

In FIG. 6A, an image intensity profile 601 along a vertical center line in a captured image of a product is shown, where the profile running from left to right represent top to bottom of the center line. In FIG. 6B, the derivative (slope) 602 of the image intensity profile in FIG. 6A in absolute value is computed and shown. If the slope is low (close to zero), the region most likely has a uniform image intensity (i.e. background) while a high slope indicates that there may be a sharp change in image intensity (i.e. the edges). Therefore, the first and the last steep slope 603, 604 represent the upper and lower boundary of the product. In other embodiments, other image analysis methods such as segmentation and foreground detection can be used to automatically determine the product center. Once the system determines the upper and lower edge of the product, the system may determine the vertical center (705 in FIG. 5) of the product. In one embodiment, the system may take the mid-point of the upper and lower edges to be the vertical center of the product.

Returning to FIG. 4, based on the vertical center of the product, the system may determine an adjustment of the camera position 404 by calculating the distance the camera has to move so that the vertical center of the product is positioned at (or within a threshold range of) the vertical center of the image. This can be calculated from the location of the slope (in pixel) and the image resolution (pixel per inch). The mechanical control system (302 in FIG. 3) may translate the distance and move the camera 405 by controlling the motor to drive the camera to desired location, and start the image capturing process.

In one embodiment, when the image capture process starts, the imaging and control sub-system (301 in FIG. 3) may synchronize with the mechanical control system (302 in FIG. 3) to align the turntable with a pre-set imaging location 410. The pre-set imaging location may correspond to each of the pre-stored capturing angles in the capture setting. The system may control the camera to capture a product image 411 once the turntable is at approximate one of the pre-stored set of capturing angles in a capture setting. This step may repeat for each of the capturing angles 413 until all product images are captured. Then, the system may store the multi-angle images to the product imaging database 412. In one embodiment, the system may store captured multi-angle images all at once to the product imaging database. In another embodiment, the system may store the multi-angle images one image at a time as each image is captured.

Alternatively and/or additionally, the system may analyze the product images from multiple angles and detect the barcode of the product 406. For example, the method and system described in U.S. Patent Application Publication No. 20150363625 to Wu et al, titled "Image Processing Methods and Systems for Barcode and/or Product Label Recognition" can be used. In an alternative embodiment, the system may include a barcode reader that may be fixedly mounted to the workstation, such as on the supporting member. When multi-angle images are being captured, the system may also control the barcode reader to constantly scan for barcode off the product being captured and continuously retrieve the readings from the barcode reader until the barcode of the product is successfully detected. In another embodiment, the system may include a handheld scanner and allow the user to directly scan the barcode off the product, any time before, during or after the capturing of the product images.

Once the system retrieves the barcode of the product automatically, this information can be embedded to the image files in the product imaging database. For example, the barcode can be used as part of the filename, stored in meta-data of the image files (e.g., tag in TIFF) etc. or used to link to the product database. The barcode can be used to prevent human errors in keeping track between acquired images and their corresponding products.

In some embodiments, the system may also include accessing to the product database using the detected barcode to populate the images acquired to the database and validate them against the images already stored in the database. For example, the system may be configured to perform a pre-scan of the product until the barcode of the product is retrieved. The system may use the barcode to look up the product imaging database to check if a complete set of images for the current product already exists. In one embodiment, if a complete set of images for the current product already exists, the system may determine to suspend the capturing of images for the product to avoid capturing duplicate images; otherwise, the system may continue the capturing process for the product, as disclosed in FIG. 4.

The pre-scan of the product can be done in various ways. For example, the pre-scan may include capturing an initial image of the product and analyzing the initial image to detect the barcode in the image. The pre-scan may also include rotating the turntable to different angles, capturing an image of the product at each rotation and detecting the barcode of the product until the barcode of the product is successfully extracted. The pre-scan may also allow the user to use a handheld scanner to scan the barcode directly on the product before the capturing process starts.

Alternatively and/or additionally, the system may store multiple sets of images for the same product in the product imaging database over time. For example, the system may have determined that a set of multiple-angle images for the current product is already existing in the product imaging database, and yet because the time when those pre-existing images were captured and the current time has exceeded a threshold, the system may determine to continue the capturing process and capture a new set of images for the same product and store them to the product imaging database. In one embodiment, a system may compare these more recent images of the product with previously captured images of the same product and track the changes in the packaging of the specific product. This information may be helpful for understanding the impact of packaging to the sale effectiveness.

Alternatively and/or additionally, the system may calculate the dimension of the product. In one embodiment, the system may receive readings from an optional range sensor that can be mounted to the supporting member to measure the distance between the image capturing device and the product. Then the system may use the measured distance, and optionally/additionally the pixel dimensions measured from the captured image, to calculate the dimension of the product. In one embodiment, based on the measured distance between the camera and the product, the system may identify the known pixel size, e.g. 1 pixel=0.01×0.01 square inch. Then the system may calculate the size of the product based on the number of pixels contained within the edges of the product, such as the upper and lower edges, the detection of which is disclosed in FIG. 5.

In some embodiments, the system for capturing multi-angle images of products may include easy to use user interface for user to streamline the capturing process. In one embodiment, the user interface may include an interface to display a video streaming from the camera, and may include a "start"/"stop" button that turns on/off the video streaming from the camera. The user interface may also include a "capture" button. When the "capture" button is clicked, the system may control the camera to take an initial image to analyze the product location and then control the DC motor to move the camera so that it is centered on the product. The system may then control the turntable to start rotating and control the image capturing device to capture images of the product at selected capturing angles in a capture setting. The user interface may include multiple panels in a window to show multiple-angle images of a product after the capturing process is completed and/or the barcode information is extracted from the images.

Figure 7:
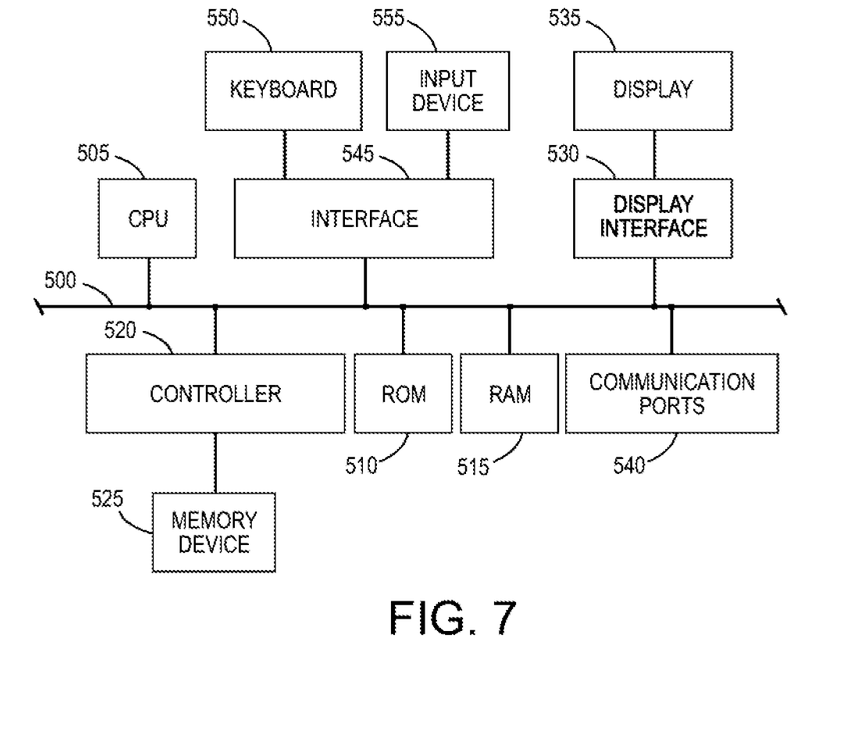
FIG. 7 is a block diagram of elements of a computing device on which the various systems and methods in this document could be implemented.

FIG. 7 depicts an example of internal hardware that may be included in any of the electronic components of the system, the computing device or another device in the system. An electrical bus 500 serves as an information highway interconnecting the other illustrated components of the hardware. Processor 505 is a central processing device of the system, configured to perform calculations and logic operations required to execute programming instructions. As used in this document and in the claims, the terms "processor" and "processing device" may refer to a single processor or any number of processors in a set of processors, whether a central processing unit (CPU) or a graphics processing unit (GPU) or a combination of the two. Read only memory (ROM), random access memory (RAM), flash memory, hard drives and other devices capable of storing electronic data constitute examples of memory devices 510, 515. A memory device may include a single device or a collection of devices across which data and/or instructions are stored.

An optional display interface 530 may permit information from the bus 500 to be displayed on a display device 545 in visual, graphic or alphanumeric format. An audio interface and audio output (such as a speaker) also may be provided. Communication with external devices may occur using various communication devices 540 such as a transmitter and/or receiver, antenna, an RFID tag and/or short-range or near-field communication circuitry. A communication device 540 may be attached to a communications network, such as the Internet, a local area network or a cellular telephone data network.

The hardware may also include a user interface sensor 545 that allows for receipt of data from a keyboard 550 and other input devices 555 such as a mouse, a joystick, a touchscreen, a remote control, a pointing device, a video input device and/or an audio input device. A positional sensor 555 and motion sensor 550 may be included to detect position and movement of the device. Data also may be received from an imaging capturing device 520 such as a scanner to acquire other data.

The above-disclosed features and functions, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. A method of acquiring images of a product, comprising:
    placing a product on a workstation comprising at least one background wall and a camera supporting member having a vertical axis, wherein the camera supporting member is configured to movably attach an image capturing device so that the image capturing device may be moved along the vertical axis of the camera supporting member;
    capturing, by the image capturing device, a first image of the product;
    analyzing, by a computing device, the captured first image and detecting a vertical center of the product;
    determining, by the computing device, when the vertical center of the product is within a proximate distance to the vertical center of the first image;
    upon determining that the vertical center of the product is not within the proximate distance to the vertical center of the first image, causing, by the computing device, the image capturing device to move along the vertical axis to a location on the vertical axis that is based on the distance between the vertical center of the product and the vertical center of the first image;
    capturing one or more additional images of the product at a plurality of image capturing angles after the image capturing device has moved to the location;
    while capturing the one or more additional images, analyzing each of the additional images and continuing to do so until the analyzing detects a barcode on the product;
    comparing the detected barcode with one or more product barcodes, each of which is associated with one or more product images stored in the product database; and
    when the detected barcode of the product matches at least one of the one or more product barcodes stored in the product database:
        comparing the one or more captured additional images of the product with one or more product images associated with the matching product barcode, and
        based on the comparing, identifying a product packaging change for the product over a period of time.

2. The method of claim 1, wherein the workstation further comprises a turntable, and capturing the one or more additional images of the product comprises:
    rotating the turntable, which in turn rotates the product; and
    capturing the one or more additional images at the plurality of capturing angles as the product rotates.

3. The method of claim 1, wherein detecting the vertical center of the product comprises:
    calculating an image intensity profile of the first image;
    calculating a derivative of the image intensity profile;
    detecting an upper edge and a lower edge of the product based on the derivative of the image intensity profile; and
    determining the vertical center of the product based on the detected upper edge and the lower edge of the product.

4. The method of claim 1, wherein detecting the vertical center of the product comprises:
    segmenting the first image; and
    detecting a foreground of the first image based on the segmented image.

5. The method of claim 1, further comprising:
embedding the detected barcode in one or more image files that include one or more of the additional images; and
storing the one or more image files with the embedded barcode in a product database.

6. The method of claim 1 further comprising:
receiving, by the computing device, a distance between the image capturing device and the product from a laser based range sensor; and
determining, by the computing device, a dimension of the product based on the one or more captured additional images and the distance between the image capturing device and the product.

7. The method of claim 1, wherein the plurality of capturing angles comprise approximately 0, approximately 90, approximately 180 and approximately 270 degrees.

8. A system for acquiring images of a product, comprising:
a computing device;
a workstation comprising:
at least one background wall, and
a camera supporting member having a vertical axis, wherein the camera supporting member is configured to movably attach an image capturing device so that the image capturing device may be moved along the vertical axis of the camera supporting member; and
a non-transitory, computer readable medium containing program instructions that are configured to cause the computing device to:
cause the image capturing device to capture a first digital image of the product,
analyze the captured first digital image and detect a vertical center of the product,
determine when the vertical center of the product is proximate to a vertical center of the first digital image,
upon determining that the vertical center of the product is not proximate to the vertical center of the first digital image, cause the image capturing device to move along the vertical axis to a location based on the distance between the vertical center of the product and the vertical center of the first image,
cause the image capturing device to capture one or more additional digital images of the product at a plurality of image capturing angles after the image capturing device has moved to the location on the vertical axis,
while capturing the one or more additional digital images, analyzing each of the additional digital images and continuing to do so until the analyzing detects a barcode on the product,
comparing the detected barcode with one or more product barcodes, each of which is associated with one or more product images stored in the product database, and
when the detected barcode of the product matches at least one of the one or more product barcodes stored in the product database:
comparing the one or more captured additional images of the product with one or more product images associated with the matching product barcode; and
based on the comparing, identifying a product packaging change for the product over a period of time.

9. The system of claim 1, wherein:
the workstation further comprises a turntable;
the program instructions to capture the one or more additional images of the product comprise instructions to:
rotate the turntable, which in turn rotates the product, and
capturing the one or more additional images at the plurality of capturing angles as the product rotates.

10. The system of claim 8 further comprising one or more light panels.

11. The system of claim 8:
further comprising a laser based range sensor mounted on the camera supporting member, wherein the laser based range sensor is configured to detect a distance between the image capturing device and the product; and
wherein the program instructions comprise additional program instructions that are configured to cause the computing device to calculate a dimension of the product based on the one or more captured additional images and the detected distance between the image capturing device and the product.

12. The system of claim 8, wherein the background wall and the working surface of the workstation intersect at a curved corner.

13. The system of claim 8, wherein the image capturing angles comprise approximately 0, approximately 90, approximately 180 and approximately 270 degrees.

14. The system of claim 9, wherein a surface of the turntable is mounted flush to the working surface of the workstation.

15. A system for acquiring images of a product, comprising:
a computing device;
a workstation comprising:
at least one background wall,
a camera supporting member having a vertical axis, and
an image capturing device movably attached to the camera supporting member so that the image capturing device may be moved along the vertical axis of the camera supporting member; and
a non-transitory, computer readable medium containing program instructions that are configured to cause the computing device to:
cause the image capturing device to capture a first digital image of the product,
analyze the captured first digital image and detect a vertical center of the product,
determine when the vertical center of the product is proximate to a vertical center of the first digital image,
upon determining that the vertical center of the product is not proximate to the vertical center of the first digital image, cause the image capturing device to move along the vertical axis to a location based on the distance between the vertical center of the product and the vertical center of the first image,
cause the image capturing device to capture one or more additional digital images of the product at a plurality of image capturing angles after the image capturing device has moved to the location on the vertical axis,
while capturing the one or more additional digital images, analyzing each of the additional digital images and continuing to do so until the analyzing detects a barcode on the product, comparing the detected barcode with one or more product barcodes, each of which is associated with one or more product images stored in the product database, and when the detected barcode of the product matches at least one of the one or more product barcodes stored in the product database:

comparing the one or more captured additional images of the product with one or more product images associated with the matching product barcode; and based on the comparing, identifying a product packaging change for the product over a period of time.

16. The system of claim 15, wherein:

the workstation further comprises a turntable;

the program instructions to capture the one or more additional images of the product comprise instructions to:

rotate the turntable, which in turn rotates the product, and capturing the one or more additional images at the plurality of capturing angles as the product rotates.

17. The system of claim 15 further comprising one or more light panels.

18. The system of claim 15:

further comprising a laser based range sensor mounted on the camera supporting member, wherein the laser based range sensor is configured to detect a distance between the image capturing device and the product; and wherein the program instructions comprise additional program instructions that are configured to cause the computing device to calculate a dimension of the product based on the one or more captured additional images and the detected distance between the image capturing device and the product.

19. The system of claim 15, wherein the background wall and the working surface of the workstation intersect at a curved corner.

20. The system of claim 15, wherein a surface of the turntable is mounted flush to the working surface of the workstation.

\* \* \* \* \*